(12) United States Patent
Kumar et al.

(10) Patent No.: US 10,462,182 B2
(45) Date of Patent: Oct. 29, 2019

(54) THIN AGENT-BASED SSL OFFLOADING (71) Applicant: VMWARE, INC., Palo Alto, CA (US)

(72) Inventors: Vasantha Kumar, Pune (IN); Leena Soman, Pune (IN); Hrishikesh Ghatnekar, Pune (IN)

(73) Assignee: VMware, Inc., Palo Alto, CA (US)

( * ) Notice: Subject to any disclaimer, the term of this patent is extended or adjusted under 35 U.S.C. 154(b) by 257 days.

(21) Appl. No.: 15/642,356

(22) Filed: Jul. 6, 2017

(65) Prior Publication Data
US 2018/0332078 A1 Nov. 15, 2018

(30) Foreign Application Priority Data

May 12, 2017 (IN) .............................. 201741016804

(51) Int. Cl.
  *H04L 29/06* (2006.01)
  *G06F 21/33* (2013.01)
  *G06F 21/53* (2013.01)

(52) U.S. Cl.
  CPC ............ *H04L 63/168* (2013.01); *G06F 21/33* (2013.01); *G06F 21/53* (2013.01); *H04L 63/0281* (2013.01); *H04L 63/0435* (2013.01); *H04L 63/0471* (2013.01); *H04L 63/0815* (2013.01); *H04L 63/0853* (2013.01); *G06F 2221/2107* (2013.01)

(58) Field of Classification Search
  CPC .............. H04L 63/168; H04L 63/0281; H04L 63/0435; H04L 63/0471; H04L 63/0815; H04L 63/0853; G06F 21/33; G06F 21/53; G06F 2221/2107
  See application file for complete search history.

(56) References Cited

U.S. PATENT DOCUMENTS

| | | | | |
|---|---|---|---|---|
| 9,930,067 | B1* | 3/2018 | Johansson | H04L 63/166 |
| 2009/0287886 | A1* | 11/2009 | Karstens | G06F 9/44557 711/147 |
| 2013/0067067 | A1* | 3/2013 | Miri | H04L 41/069 709/224 |
| 2014/0241144 | A1* | 8/2014 | Kashyap | H04L 47/365 370/216 |
| 2014/0337637 | A1* | 11/2014 | Kiperberg | G06F 21/14 713/189 |
| 2016/0337236 | A1* | 11/2016 | Hsu | H04L 45/64 |
| 2017/0003999 | A1* | 1/2017 | Dalal | G06F 9/45558 |
| 2017/0289109 | A1* | 10/2017 | Caragea | G06F 9/45504 |
| 2017/0295148 | A1* | 10/2017 | Wright | H04W 12/06 |
| 2018/0063193 | A1* | 3/2018 | Chandrashekhar | G06F 15/177 |
| 2018/0262468 | A1* | 9/2018 | Kumar | H04L 63/0281 |

* cited by examiner

*Primary Examiner* — Sarah Su
(74) *Attorney, Agent, or Firm* — Patterson + Sheridan, LLP (57) ABSTRACT

Exemplary methods, apparatuses, and systems perform a secure socket layer (SSL) protocol initialization and maintenance on behalf of a virtual machine (VM). When a secure virtual machine (SVM) receives a data packet sent by an application running on a VM, the SVM transmits a request message to the VM to enable the VM to perform a handshake with a destination computer to initiate an encrypted session between the VM and the computer. Once the encrypted session is active, the SVM encrypts the data packet, and transmits the encrypted data packet to the VM to perform the transmission of the encrypted data packet to the destination server.

20 Claims, 4 Drawing Sheets

THIN AGENT-BASED SSL OFFLOADING

RELATED APPLICATIONS

Benefit is claimed under 35 U.S.C. 119(a)-(d) to Foreign Application Serial No. 201741016804 filed in India entitled "THIN AGENT-BASED SSL OFFLOADING", on May 12, 2017, by VMware, Inc., which is herein incorporated in its entirety by reference for all purposes.

FIELD OF THE INVENTION

The various embodiments described in this document relate to the management of secure data connections between virtual machine devices and computers.

BACKGROUND OF THE INVENTION

Secure sockets layer (SSL) is a cryptographic protocol used to securely send data over a network. For example, an application configured to use SSL encryption establishes a secure connection with a server encrypts data using a shared secret negotiated during the establishment of the secure connection, and sends encrypted data to the destination server. A security policy requiring applications to send and receive data using SSL, however, creates complications for applications not configured to use SSL and for legacy applications not configured to use the correct version of SSL. If an administrator modifies or establishes a security policy requiring use of SSL, a user, developer, or administrator would need to modify, update, or replace each of these applications to comply.

One approach to avoiding the need to modify, update, or replace applications is to add an SSL offloading device that acts as a proxy between the application and the server to perform SSL offloading. In this approach, the SSL offloading device initiates the SSL connection, encrypts and sends data to the server on behalf of the application, and receives and decrypts data from the server on behalf of the application. The deployment and configuration of such a device, however, is a complex task. This approach also incurs performance overhead as it splits the data transmission process into two connections: a first connection between the application and the SSL offloading device, and a second connection between the SSL offloading device and the server. When the SSL offloading device handles the SSL functionality for many applications, this second connection for each application can result in overhead and bottleneck issues for the SSL offloading device.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

This document describes embodiments that implement a method of initiating and maintaining encrypted connections between applications running on virtual machines and server computers. These connections between applications running on Virtual machines and server computers can use different protocols to encrypt data, including SSL, TLS, and other cryptographic protocols. For applications to communicate (e.g., send data packets) with a server computer, a security profile may require such communications to be secure, e.g., through the use of the SSL protocol to encrypt data. Using an SSL offloading process as described in this document, a secure virtual machine (SVM) provides a virtual machine (VM) the SSL initialization (e.g., SSL handshake), stores the session identifier for maintenance of the SSL connection, and encrypts and decrypts data packets sent between the application running on the VM and the server computer. The VM receives the data packets from the server and transmits the data packets to the server. This process reduces the potential bottleneck at the SVM if the SVM were to receive the data packets from and transmit the data packets to the server computer on behalf of each VM via its own TCP/IP connection directly with the server computer. The process described herein further eliminates the need for the VM and applications running within the VM to each maintain their own SSL functionalities, including updating software and configurations.

Figure 1:
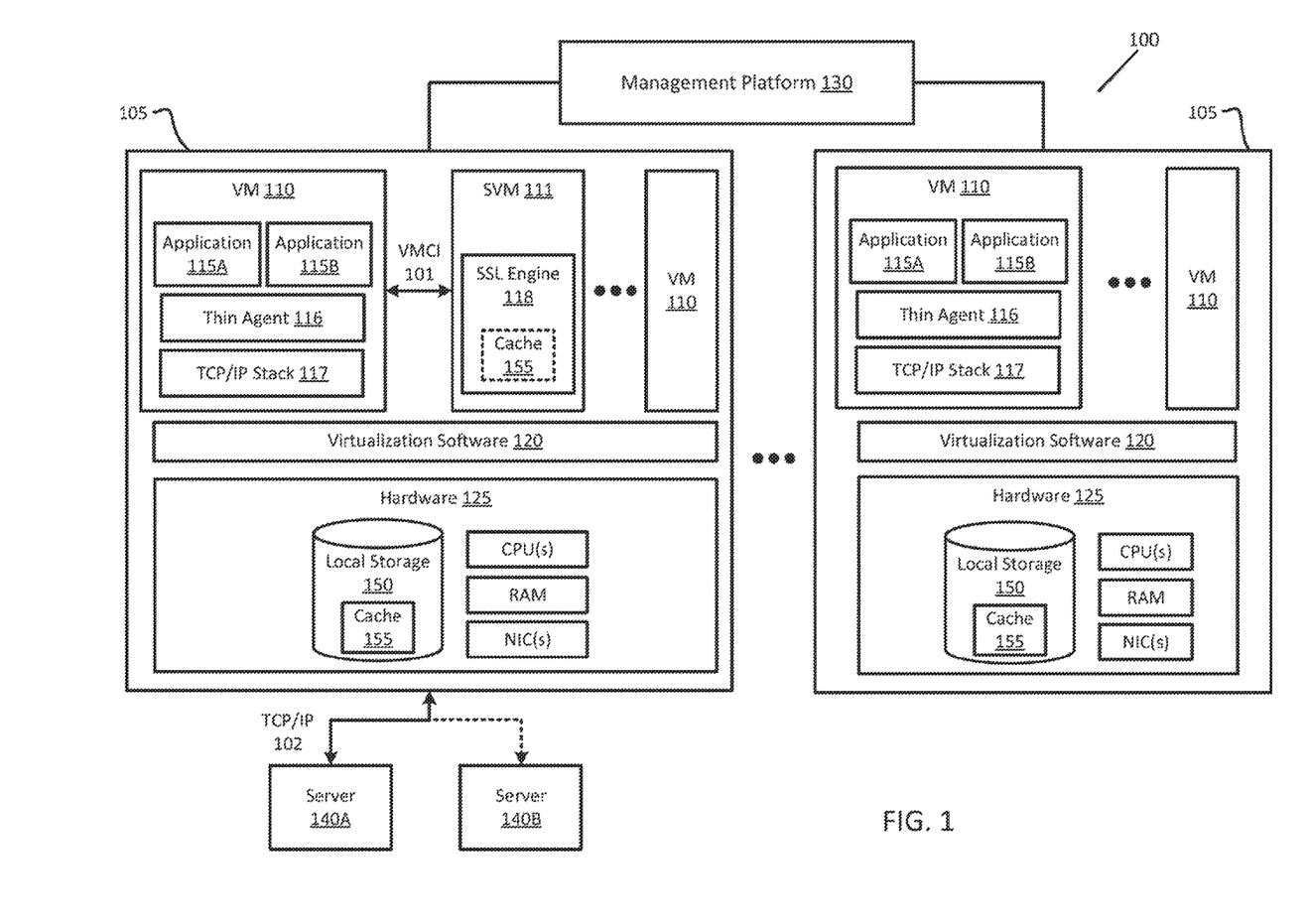
FIG. 1 illustrates, in block diagram form, an exemplary virtual data center environment including one or more networked nodes configured to perform SSL offloading.

FIG. 1 illustrates, in block diagram form, exemplary computing environment 100, including one or more networked nodes 105 configured to perform SSL offloading. This document may also refer to nodes 105 as hosts, computers, processing devices, and/or servers. While this document refers to server computers 140A and 140B, these devices can also be referred to as computers and VMs. In one embodiment, server-based computing in computing environment 100 provides centrally-managed user virtual desktops, such as those implemented by virtual machines (VMs) 110, via one or more networks (e.g., a local area network or other private or publicly accessible wide area network, such as the Internet). For example, a client device and a VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by the VM 110. In one embodiment, one or more VMs 130 implement a virtualized computer, networking, storage, or security service (e.g., a firewall, webserver, database server, etc.). In one embodiment, computing environment 100 provides segregated server-based computing environments for multiple datacenter tenants. A datacenter tenant refers to a group of users that share common access with specific privileges. For example, the group of users may have common access to stored data objects, applications, etc. that users of another tenant may not access.

VM 110 includes applications 115A and 115B, thin agent 116, and network protocol stack (TCP/IP) 117. In one embodiment, all VMs 110 in nodes 105 include similar components. Applications 115A and 115B are software configured to perform specific tasks and functions. In one embodiment, application 115A interfaces with a server computer 140A. For example, a browser application accesses a web server computer to provide access to information stores on the Internet or private file systems. Thin agent 116 intercepts data packets sent from applications 115A and 115B prior to the data packets reaching TCP/IP stack 117.

Thin agent 116 redirects the data packets to SVM 111 for SSL handling as described with reference to FIGS. 2-4. Thin agent 116 also intercepts data packets sent to applications 115A and 115B prior to the data packets passing from TCP/IP stack 117 to applications 115A and 115B. Thin agent 116 also redirects these data packets to SVM 111 for SSL handling. Thin agent 116 further receives packets from SVM 111 and injects the packets into TCP/IP stack 117 (e.g., when encrypted by SVM 111 according to the SSL session and for transmission to server 140A) or passes the packets to application(s) 115 (e.g., when decrypted by SVM 111 according to the SSL session).

TCP/IP stack 117 manages the transmission of data packets. In one embodiment, TCP/IP stack 117 transmits, via visualization software 120 and one or more network interfaces within hardware 125, data packets across a TCP/IP connection 102 to server computers 140A and 140B. While illustrated and described with reference to TCP/IP, other embodiments may include a network protocol stack 117 and connection 102 that implement and/or utilize another network protocol.

FIG. 1 illustrates a single SVM 111, but each of two or more nodes 105 may include a SVM 111. SVM 111 includes SSL engine 118. As described in greater detail with reference to FIGS. 2-4, SSL engine 118 manages SSL functionality, including performing an SSL handshake with a destination device (e.g., server computer 140A), encryption of data packets, and decryption of data packets. In addition, SSL engine performs maintenance of information in cache 155, including storage of data packets and session identifiers linked to source addresses and destination addresses. In one embodiment, SSL engine 118 performs health quality analyses of the SSL connection between VM 110 and server computers to determine whether to establish the SSL connection with a different server computer (e.g., for load balancing).

Communication channel 101 facilitates communication between VMs 110 and between VMs 110 and nodes 105. For example, communication channel 101 provides for communication between VM 110 and SVM 111. Communication channel 101 transports data packets sent by thin agent 116 to SVM 111 for SSL encryption or decryption, and transports the encrypted or decrypted data packets sent by SVM 111 to thin agent 116. Additionally, communication channel 101 transports SSL handshake messages between thin agent 116 and SVM 111 for establishing an SSL session between an application 115 and a server 140A. While illustrated with reference to VMCI, in another embodiment, communication channel 101 utilizes a different high speed communications protocol. Additionally, while FIG. 1 illustrates communication channel 101 as being between VM 110 and SVM 111 within a single node 105, a VM 110 and a SVM 111 may communicate via communication channel 101 despite the VM 110 running on a different node 105 than SVM 111.

Hardware 125 includes one or more processors ("CPU(s)") data storage and memory (e.g., "RAM"), and network interface controllers ("NIC(s)"). Node 105 uses the data storage and memory for storing data, metadata, and programs for execution by the processors). The data storage and memory may include one or more of volatile and non-volatile memories, such as Random Access Memory ("RAM"). Read Only Memory ("ROM"), a solid-state drive ("SSD"), Flash, Phase Change Memory ("PCM"), or other types of data storage, such as magnetic storage devices, optical storage devices, etc. The memory may be internal or distributed memory. In one embodiment, local storage 150 in node 105 includes cache 155. SSL engine 118 uses cache 155 to maintain information to support SSL functionality. In one embodiment, cache 155 resides in SVM 111. For example, visualization software 120 may manage memory or storage within hardware 125 to present cache 155 to SVM 111 such that the cache appears as a dedicated resource of SSL Engine 118.

One or more buses may interconnect the various components of hardware 125. Additionally, the network interface controllers may connect nodes 105, via a wired or wireless network, with one another.

Visualization software 120 runs on hardware 125 of host server or node (e.g., a physical computer) 105. Visualization software 120 manages VMs 110 and physical resources, such as hardware 125. Additionally, visualization software 120 maintains virtual-to-physical hardware mappings. For example, virtualization software 120 may manage VM access to a processor, memory, or a network interface within hardware 125. Additionally, visualization software 120 may manage access to virtual disks (or portions thereof) and other related files within local storage 150 accessible by VMs 110 residing in one or more nodes 105.

Management platform 130 enables an administrator to manage the configuration of computing environment 100. In one embodiment, management platform 130 provides a management console for manual and automated control of nodes 105, VMs 110, and hardware 125. For example, management platform 130 may provision, configure, and maintain VMs 110 as virtual desktops or network services, manage pools of computer resources to run VMs 110, etc. In one embodiment, an administrator sets and/or defines storage policies using management platform 130.

Local storage 150, housed in or otherwise directly attached to the nodes 105 may include combinations of solid-state drives (SSDs) and/or magnetic or spinning disks (MDs). As used in this document, the term "housed" or "housed in" encompasses both housed in or otherwise directly attached storage. In some embodiments, SSDs serve as a read cache and/or write buffer in front of magnetic disks to increase I/O performance.

It will be apparent from this description that aspects of the inventions may be embodied, at least in part, in software. That, is, computer-implemented methods 200, 300, and 400, may be carried out in a computer system or other data processing system, such as nodes 105, in response to its processor executing sequences of instructions contained in a memory or another non-transitory machine-readable storage medium. The software may further be transmitted or received over a network (not shown) via a network interface. In various embodiments, hardwired circuitry may be used in combination with the software instructions to implement the present embodiments, it will also be appreciated that additional components, not shown, may also be part of nodes 105, and, in some embodiments, fewer components than that shown in FIG. 1 may also be used in nodes 105.

Figure 2:
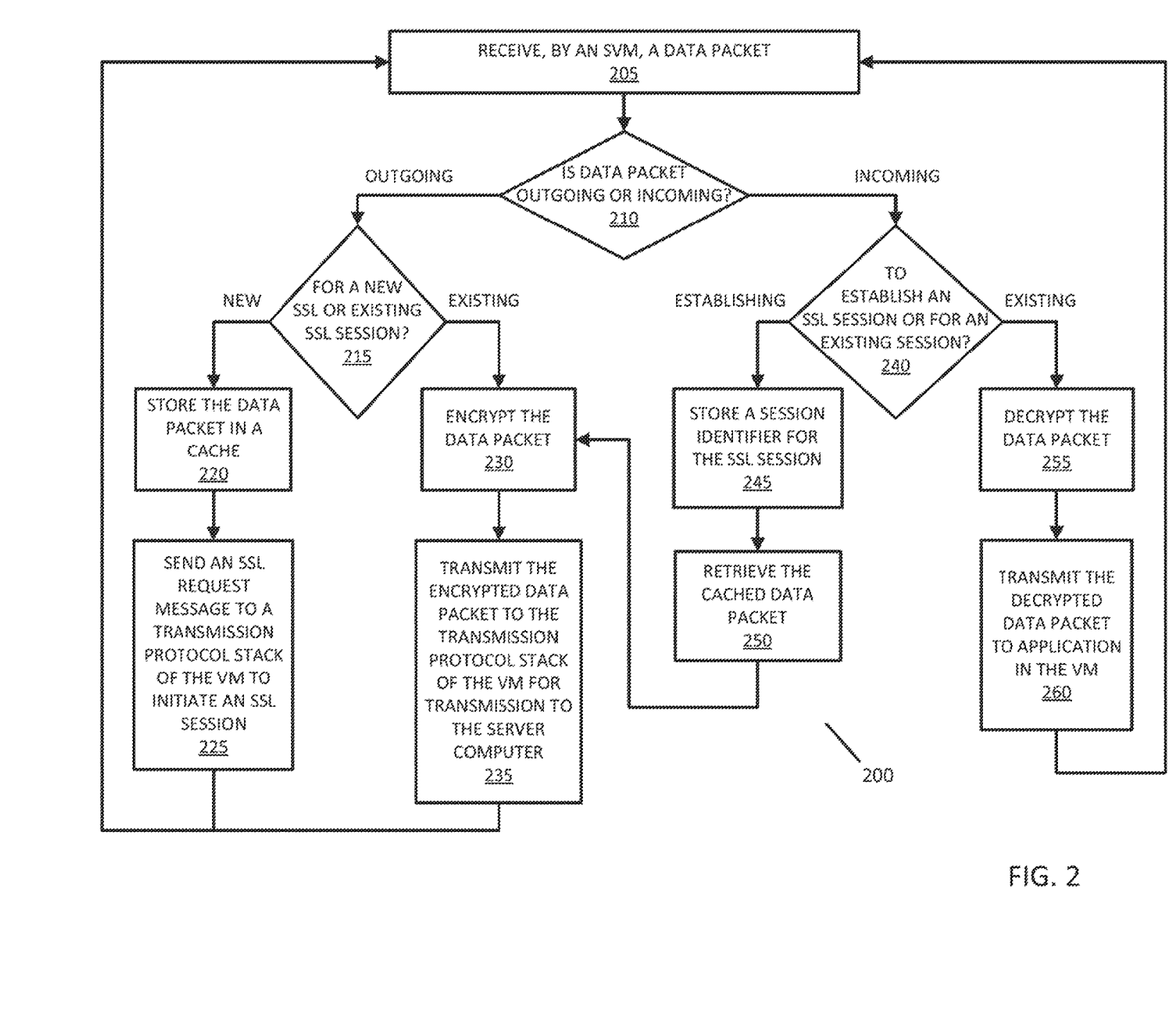
FIG. 2 is a flow chart illustrating an exemplary method of performing SSL offloading to a secure virtual machine.

FIG. 2 is a flow chart illustrating exemplary method 200 of performing SSL offloading to a secure virtual machine.

At block 205, SVM 111 receives a data packet. For example, thin agent 116 of VM 110 intercepts the data packer and sends the intercepted data packet to SVM 111. In one embodiment, application 155A addresses the data packet for transmission to server computer 140A. Thin agent 116 intercepts the data packet prior to the data packet's transmission to server computer 140A. For example, thin agent 116 intercepts the data packet before VM 110 places the data packet in TCP/IP stack 117. As another example, thin agent 116 intercepts a data packet sent from server computer 140A prior to delivery to application 115A and sends the intercepted data packet to SVM 111. In some examples, thin agent 116 intercepts the data packets in response to a security policy that requires SSL encryption of the data packets for a particular application or server. In other examples, thin agent 116 intercepts the data packets in response to identifying that the destination address of the data packets is mapped to an existing SSL session (e.g., based on SSL connection data stored in cache 155).

Thin agent 116 sends the intercepted data packet to SVM 111 across a data communications channel. In one embodiment, the communications channel 101 is a virtual machine communication interface (VMCI), which facilitates fast and efficient communication between SVM 111 and VM 110.

In one embodiment, thin agent 116 runs in VM 110. In other embodiments, thin agent 116 runs as a module of virtualization software 120, and virtual machines operating within a corresponding node 105 access thin agent 116.

At block 210, SVM 111 determines if the data packet is an outgoing data packet (e.g., a data packet with a server computer as its destination) or an incoming packet, (e.g., a data packet, with an application in VM 110 as its destination). When the data packet is an outgoing data packet, the flow proceeds to block 215. When the data packet is an incoming data packet, the flow proceeds to block 240.

At block 215, SVM 111 determines whether the outgoing data packet is for a new SSL session or for an existing SSL session. For example, SVM 111 determines a source identifier and a destination identifier associated with the outgoing data packet. SVM 111 accesses a data structure storing information regarding active SSL sessions and determines if there is an active SSL session having a source identifier and a destination identifier that matches the source identifier and the destination identifier associated with the outgoing data packet. When there is a match to an existing SSL session that is active, SVM 111 can use the existing SSL session to handle the outgoing data packet and the flow proceeds to block 230. When the outgoing data packet is for a new SSL session, the flow proceeds to block 220.

At block 220, when the outgoing data packet is (or a new SSL session, SVM 111 stores the intercepted data packet in cache 155. In one embodiment, SSL engine 118 stores the intercepted data packet in cache 155 with a source identifier associated with VM 110 and a destination identifier associated with server computer 140A. In one embodiment, SSL engine 118 stores the intercepted data packet in cache 155 while SSL engine performs steps to initiate an SSL session, including an SSL handshake.

At block 225, SVM 111 sends an SSL request message to TCP/IP stack 117 of VM 110. In one embodiment, SSL engine 118 generates the SSL request or handshake message to initiate an SSL session between VM 110 and server computer 140A. SSL engine 118 generates the SSL request message using the destination address of the intercepted data packet, e.g., the address of server computer 140A. In one embodiment, SVM 111 sends the SSL request message to thin agent 116 for injection into TCP/IP stack 117 of VM 110. For example, thin agent 116 may intercept connect and accept socket calls and inject packets into TCP/IP stack 117 at layer 4 (socket layer). Thin agent 156 also intercepts send and receive socket calls, used to exchange data between VM 110 and server computer 140A. In a similar manner. As a result, SVM 111 is able to implement SSL communication in a manner that is transparent to applications 115A and 115B. While VM 110 is described having TCP/IP stack 117, in other embodiments, the transmission protocol is UDP, DCCP, or another appropriate protocol type.

In one embodiment SVM 111 sends the SSL request message to TCP/IP stack 117 of VM 110 to initiate an SSL session between VM 110 and server computer 140A (e.g., an SSL handshake), VM 110 and server computer 140A perform the SSL handshake by SVM 111 and server computer 140A determining a cryptographic algorithm and establishing and exchanging encryption keys for encrypting/decrypting data packets sent between VM 110 and server computer 140A. The flow proceeds to block 205 where SVM 111 receives additional data packets, including an SSL response message.

SVM 111 establishing the SSL session in this manner eliminates or reduces the need to individually update or modify individual applications in response to security policy changes. Similarly, any modifications made to the SSL connection only requires a single update to SSL engine 118. In one embodiment, SVM 111 stores private keys for each SSL session. SVM 111 storing the private keys provides additional security as VM 110 can only access server 140A through SVM 111.

At block 230, when the outgoing data packet is for an existing SSL session. SVM 111 encrypts the data packet. In one embodiment, SSL engine 118 encrypts the data packet with the encryption key(s) established via the SSL handshake process with server computer 140A.

At block 230, SVM 111 transmits the encrypted data packet to TCP/IP stack 117 of VM 110 for transmission to server computer 140A. In one embodiment, SSL engine 118 sends the encrypted data packet to SVM 111 across communication channel 101. SVM 111 sends the encrypted data packet to thin agent 116 for injection into TCP/IP stack 117 of VM 110. In other embodiments, SVM 111 sends or otherwise injects the encrypted data packet directly into TCP/IP stack 117 of VM 110. Method 200 proceeds to block 205 where SVM 111 receives additional data packets.

At block 240, SVM 111 determines whether the incoming data packet is for establishing a new SSL session or associated with an existing SSL session. When the incoming data packet is for establishing a new SSL session, the flow proceeds to block 245. When the incoming data packet is for an existing SSL session, the flow proceeds to block 255.

At block 245, SVM 111 stores a session identifier tor the established SSL session in cache 155. In one embodiment, SVM 111 associates the stored session identifier with an address or identifier for VM 110 and/or server computer 140A. For example, SVM 111 receives the incoming data packet is in the form of an SSL response message from server computer 140A, and retrieves the session identifier from the SSL response message. Server computer 140A sends the SSL response message to VM 110 via TCP/IP channel 102, thin agent 116 intercepts the SSL response message, and thin agent re-directs the SSL response message to SVM 111 via communication channel 101. In one embodiment, the SSL response message indicates that the SSL session between VM 110 and server computer 140A is active. For example, the SSL response message confirms that an SSL handshake process initiated by the SSL request message sent in block 225. As part of the SSL handshake process, SVM 111 (via VM 110) and server computer 140A exchange information for establishing the SSL session, including an SSL version number, cryptographic algorithms or ciphers, authentication data (e.g., via digital certificates). Following the authentication process, SVM 111 and server computer 140A exchange private keys (e.g., symmetric keys used to encrypt and decrypt data packets) to complete the SSL handshake process.

At block 250, SSL engine 118 retrieves the stored data packet from cache 155 to perform, the encryption. Method 200 then proceeds to block 230, as described above, for encryption and transmission of the retrieved data packet.

At block 255, when the incoming data packet is for an existing SSL session, SVM 111 decrypts the data packet. In one embodiment, SSL, engine 118 decrypts the data packets with the key(s) established during the SSL handshake process.

At block 260, SVM 111 transmits the decrypted data packet to VM 110 across communication channel 101. For example, SVM 111 transmits the decrypted data packet to application 115A in VM 110 via thin agent 116.

Figure 3:
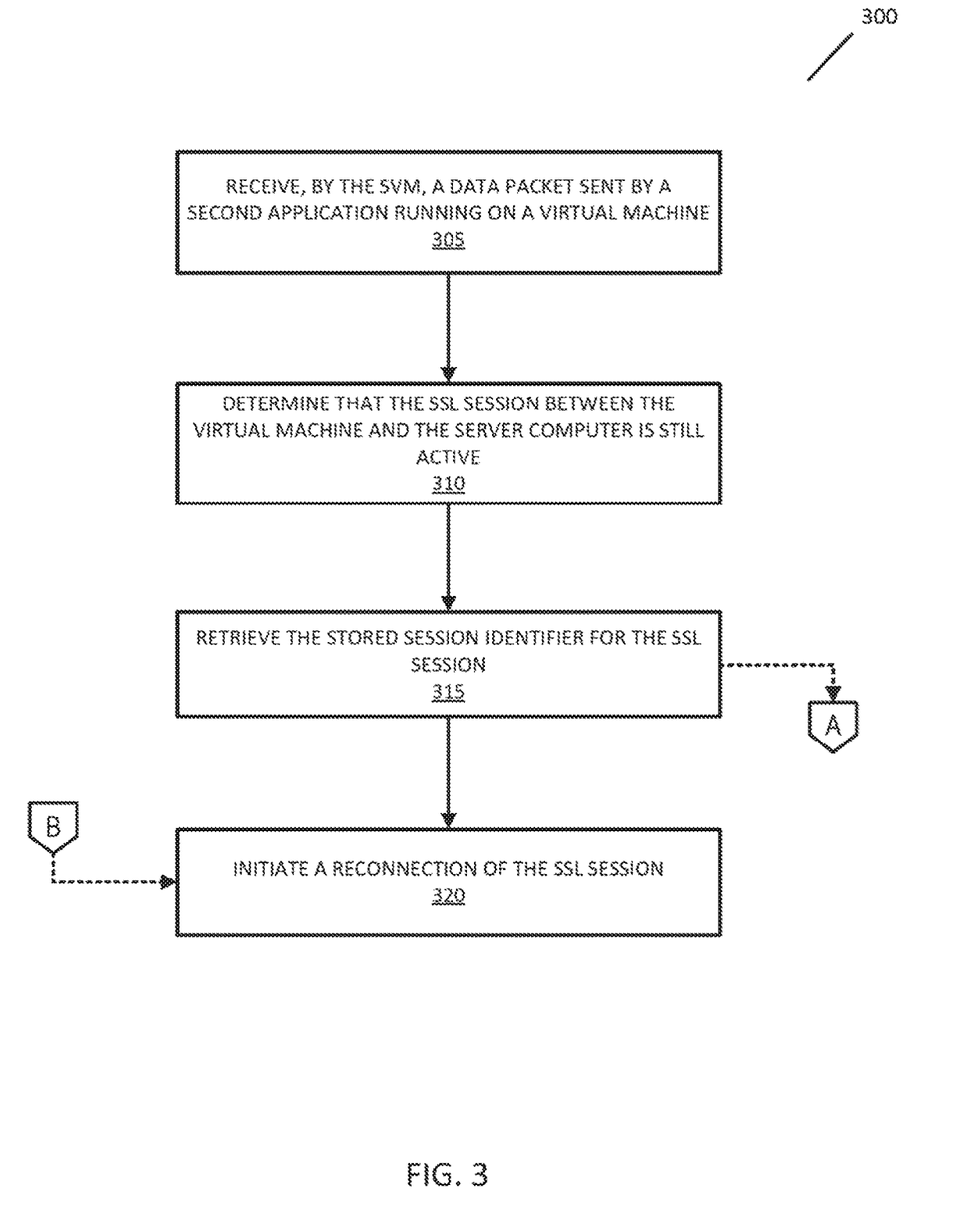
FIG. 3 is a flow chart illustrating an exemplary method of reconnecting an active SSL session.

FIG. 3 is a flow chart illustrating an exemplary method 300 of reconnecting an active SSL session.

At block 305, SVM 111 receives a data packet sent by application 115B running on VM 110. Thin agent 116 intercepts the data packet and sends the intercepted data packet to SVM 111. For example, application 115B addresses the data packet for transmission to server computer 140A. Thin agent 116 intercepts the data packet prior to placement of the data packet in TCP/IP stack 117 for transmission to server computer 140A.

At block 310, SVM 111 determines that an SSL session between VM 110 and the server computer 140A (e.g., the connection established in method 200) is still active. In one embodiment, SSL engine 118 determines the SSL connection is still active using a source identifier associated with VM 110 and a destination identifier associated with server computer 140A. For example, SSL engine 118 accesses cache 155 to determine whether a stored session identifier maps to source and destination identifiers that match the source identifier and destination identifier of the data packet.

In one embodiment, SSL engine 118 determines that the SSL session between VM 110 and the server computer 140A is still active based on a timeout period associated with the SSL session. For example, when the timeout period expires, SSL engine 118 considers the connection to be idle, and the SSL connection becomes inactive. Until the timeout period expires, SSL engine 118 considers the connection to be active. In one embodiment, SVM 111 deletes a session identifier from cache 155 upon the session becoming inactive.

At block 315, SVM 111 retrieves the stored session identifier for the SSL session. In one embodiment, SSL engine 118 optionally performs a health quality analysis of the SSL session between VM 110 and server computer 140A (e.g., by proceeding with method 400 at block 405 via off-page connector A).

At block 320, SVM 111 initiates a reconnection of the SSL session between VM 110 and server computer 140A. In one embodiment, SVM 111 transmits the retrieved session identifier to thin agent 116 of VM 110 for transmission to server computer 140A. Server computer 140A compares the received session identifier and determines whether the received session identifier matches a stored session identifier. When server computer 140A locates a matching session identifier, this indicates to server computer 140A that VM 110 was previously authenticated and to resume the SSL session.

By reconnecting the active SSL session between VM 110 and server computer 140A, the SSL engine does not have to repeat the SSL handshake process performed when the SSL session was first established, as described in method 200. Reconnecting or otherwise reusing an active SSL session requires an exchange of fewer packets than an initial handshake. As a result, the reconnection or reuse of the SSL session increases the speed at which, e.g., a webpage loads or server computes 140 provides another service. In one embodiment SVM 111 establishes an SSL session for a first application 115 running on a first VM 110 and reuses that SSL session for the same or another application 115 running on a second/different VM 110.

In one embodiment, SVM 111 performs single sign-on services. In such embodiments, SSL engine 111 establishes an SSL connection between VM 110 and server computer 140A using private keys based on permissions for a user that indicate the user is authorized to access server computer 140 with single sign-on (e.g., the user is in a particular group with permission to access server computer 140). For example, when SSL engine 118 initiates a connect request to server computer 140, thin agent 116 collects user session information and sends the user session information to SSL engine 118. When SSL engine 118 determines that the user is allowed for single sign-on with server computer 140, SSL engine 118 establishes the SSL connection using the private keys. Conversely, SSL engine 118 does not establish the SSL connection for users without permission and returns an indication of the denial of access to thin agent 116.

In another embodiment, SVM 111 maintains and enforces permissions associated with user credentials. In such embodiments, SSL engine 118 queries a database to determine permissions associated with the user credentials. In one embodiment, the database is in cache 155. In other embodiments, the database is in local storage 150, SSL engine 118 grants the user session access to the SSL session in response to determining the permissions associated with the user credentials grant access to the server computer. For example, the database may indicate whether the user belongs to a specific group (e.g., an engineering group). In this example, if server computer 140A is accessible only to users within the engineering group, SSL engine 118 grants access when an indicator indicates that the user is in the engineering group, and blocks access when an indicator indicates that the user is not in the engineering group.

Figure 4:
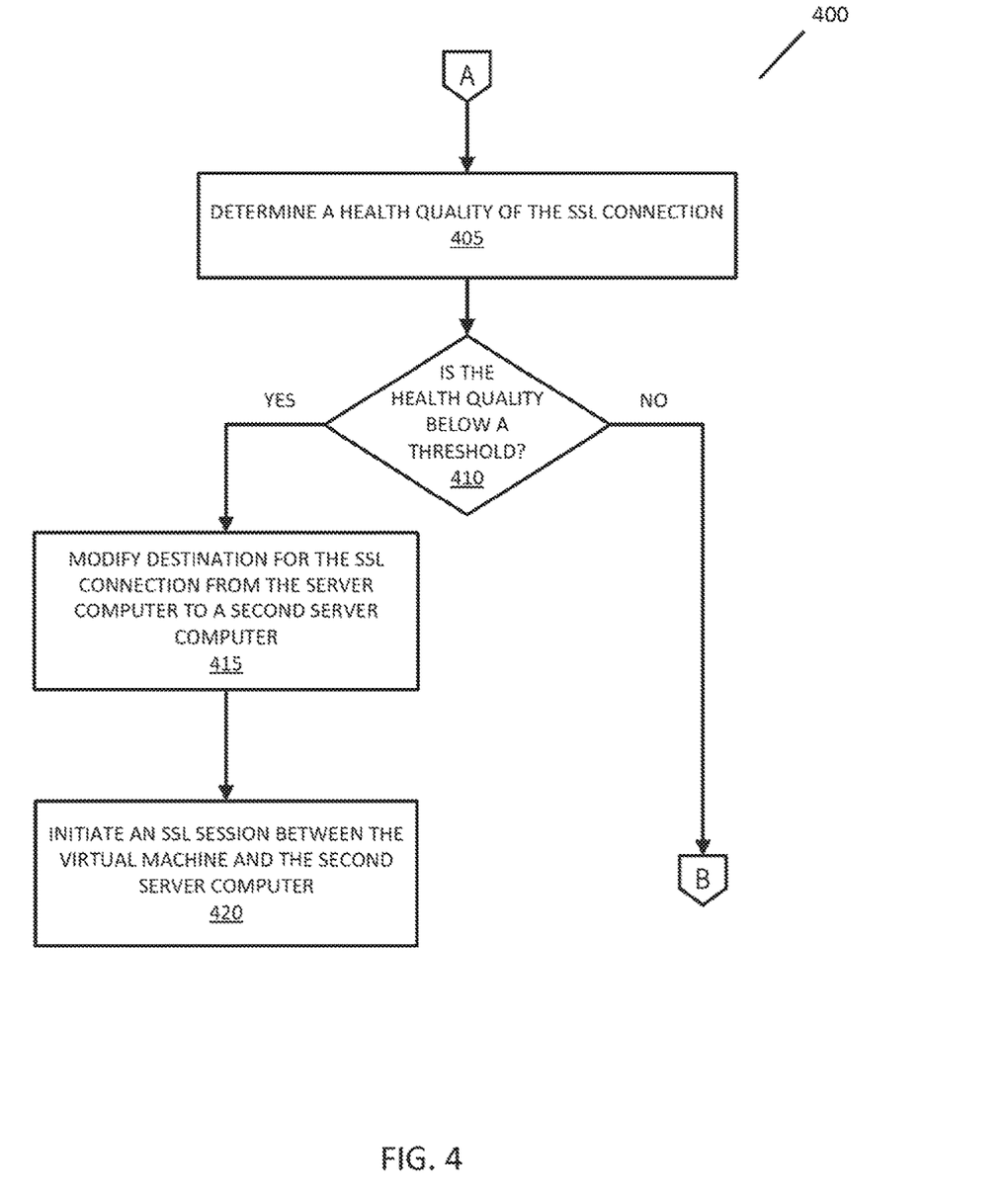
FIG. 4 is a flow chart illustrating an exemplary method of performing a load balancing process based on a health quality of the SSL connection.

FIG. 4 is a flow chart illustrating an exemplary method of performing a load balancing process based on a health quality of the SSL connection.

At block 405, SVM 111 determines a health quality of the connection between VM 110 and server computer 140A for an SSL session. In one embodiment, SSL engine 118 determines a destination address associated with the data packet received in step 305 of method 300. For example, SSL engine 118 determines that the destination address associated with the data packet is the address for server computer 140A. In one embodiment, SSL engine 118 determines the health qualify of the SSL connection between VM 110 and server computer 140A by checking a round-trip time for data sent across the SSL connection. In another embodiment, SSL engine 118 determines the health quality of the SSL connection based on an amount of data (e.g., a load amount) server computer 140A is currently receiving. In another embodiment, SSL engine 118 determines the health qualify of the SSL connection based on a heartbeat of server computer 140A. In one embodiment, SSL engine 118 determines the health quality of the SSL connection between VM 110 and server computer 140A based on a combination of factors.

At block 410, SVM 111 determines whether the health quality of the SSL connection between VM 110 and server computer 140A is below a threshold value. In one embodiment, SSL engine 118 compares the determined round-trip time of data packets sent across the SSL connection with a predetermined value established by default or manually provided, or with a machine-learned value based on history of data packets sent across the SSL connection. In another embodiment, SSL engine 118 compares the determined amount of data server computer 140A is currently handling with a threshold value. In another embodiment, SSL engine 118 determines whether or not it has received the heartbeat of server computer 140 within a threshold period of time.

When the health quality of the SSL connection is not below or otherwise outside of the threshold value/range, the method proceeds to block 320 of method 300 via off-page connector B. When the health quality of the SSL connection is below or otherwise outside of the threshold value/range, the method proceeds to block 415.

At block 415, SVM 111 modifies a destination for the SSL connection from server computer 140A to server computer 140B when the health quality of the SSL, connection between VM 110 and server computer 140A is below or otherwise outside of the threshold value/range. In one embodiment, SSL engine 118 modifies the destination address contained in the intercepted data packets from the original destination (e.g., server computer 140A) to the new destination (e.g., server computer 140B). In another embodiment, SSL engine 118 sends a notification message to thin agent 116 to direct the data packets to the destination address of server computer 140B. In some embodiments, the destination address is one of a URL and an IP address.

At block 420, after SVM 111 modifies the destination address for the SSL connection from server computer 140A to server computer 140B, SVM 111 initiates an SSL session between VM 110 and server computer 140B. For example, SVM 111 may perform the portion of method 200 beginning at block 220 to initiate the new SSL session.

Subsequently, SVM 111 modifies a source address of data packets received from server computer 140B. For example, SSL engine 118 modifies the source address from the address of server computer 140B to the address of server computer 140A. As application 115A originally sent the data packet with the destination address of server computer 140A, application 115A expects a response from server computer 140A. By modifying the source address of the data packet sent from server computer 140B, application 115A receives the data packet with an expected source address (e.g., server computer 140A), even if a different source (e.g., server computer 140B) sent the data packet.

In an alternative embodiment, SVM 111 performs load balancing through other methods. In one embodiment, SVM 111 performs a round-robin method of selecting a server computer to handle the data packets. For example, SVM 111 send a first set of data packets to server computer 140A, a second set of data packets sent to server computer 140B, and continuing to additional server computers, depending on the number of server computers available, before returning to server computer 140A.

In the embodiment described in FIG. 4, SSL engine 118 performs the health quality analysis on an existing connection. In other embodiments, SSL engine 118 performs the health qualify analysis on new connections and modifies the destination for the SSL connection before the SSL engine 118 establishes the SSL connection.

An article of manufacture may be used to store program code providing at least some of the functionality of the embodiments described above. Additionally, an article of manufacture may be used to store program code created using at least, some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, container's that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be an type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in some embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
   receiving, by a first virtual machine, a data packet sent by an application running on a second virtual machine, addressed for transmission to a computer, and intercepted prior to being transmitted to the computer;
   storing the data packet in a cache;
   sending a request message to a transmission protocol stack of the second virtual machine, the request message used to initiate an encrypted session between the second virtual machine and the computer;
   receiving a response message indicating the encrypted session between the second virtual machine and the computer is established;
   in response to receiving the response message indicating the encrypted session between the second virtual machine and the computer is established, encrypting the stored data packet; and
   transmitting the encrypted data packet to the transmission protocol stack of the second virtual machine for transmission to the computer.

2. The computer-implemented method of claim 1, further comprising:
   receiving, by the first virtual machine, a second data packet sent by a second application running on the second virtual machine, addressed for transmission to the computer, and intercepted prior to being transmitted to the computer;
   determining, using a source identifier associated with the second virtual machine and a destination identifier associated with the computer, that the encrypted session between the second virtual machine and the computer is still active;
   in response to determining that the encrypted session is still active, retrieving a stored session identifier for the encrypted session; and
   initiating a reconnection of the encrypted session.

3. The computer-implemented method of claim 2, wherein initiating the reconnection of the encrypted session comprises:
   storing the session identifier for the established encrypted session between the second virtual machine and the computer in the cache; and
   transmitting the stored session identifier to the second virtual machine.

4. The computer-implemented method of claim 3, further comprising:
   determining that a health quality of an encrypted connection associated with the encrypted session is below a threshold;
   in response to determining that the health quality of the encrypted connection is below the threshold, modifying a destination for the encrypted connection associated with the stored session identifier from the computer to a second computer.

5. The computer-implemented method of claim 4, wherein determining that the health quality of the encrypted connection associated with the encrypted session is below the threshold comprises:
   determining the health quality of the encrypted connection based on one or more of an amount of load to the computer and a heartbeat time for data sent to the computer; and
   comparing the determined health quality to the threshold.

6. The computer-implemented method of claim 3, further comprising:
   identifying, by the first virtual machine, user credentials associated with a user session that initiated the transmission of the second data packet;
   querying a database to determine permissions associated with the user credentials;
   granting the user session access to the encrypted session in response to determining the permissions associated with the user credentials grant access to the computer.

7. The computer-implemented method of claim 1, further comprising:
   receiving, by the first virtual machine, a second data packet sent by the computer, addressed for transmission to the application running on the second virtual machine, and intercepted prior to being received by the second virtual machine;
   storing the second data packet in the cache;
   decrypting the stored second data packet using an algorithm associated with the session identifier for the established encrypted session between the second virtual machine and the computer; and
   transmitting the decrypted second data packet to the application running on the second virtual machine.

8. The computer-implemented method of claim 1, wherein the stored data packet is encrypted using private keys stored by the first virtual machine.

9. A non-transitory computer-readable medium storing instructions, which when executed by a processing device, cause the processing device to perform a method comprising:
   receiving, by a first virtual machine, a data packet sent by an application running on a second virtual machine, addressed for transmission to a computer, and intercepted prior to being transmitted to the computer;
   storing the data packet in a cache;
   sending a request message to a transmission protocol stack of the second virtual machine, SSL request message used to initiate an encrypted session between the second virtual machine and the computer;
   receiving a response message indicating the encrypted session between the second virtual machine and the computer is established;
   in response to receiving SSL response message indicating the encrypted session between the second virtual machine and the computer is established, encrypting the stored data packet; and transmitting the encrypted data packet to the transmission protocol stack of the second virtual machine for transmission to the computer.

10. The non-transitory computer-readable medium of claim 9, further comprising:
receiving, by the first virtual machine, a second data packet sent by a second application running on the second virtual machine, addressed for transmission to the computer, and intercepted prior to being transmitted to the computer;
determining, using a source identifier associated with the second virtual machine and a destination identifier associated with the computer, that the encrypted session between the second virtual machine and the computer is still active;
in response to determining that the encrypted session is still active, retrieving a stored session identifier for the encrypted session; and
initiating a reconnection of the encrypted session.

11. The non-transitory computer-readable medium of claim 10, wherein initiating the reconnection of the encrypted session comprises:
storing the session identifier for the established encrypted session between the second virtual machine and the computer in the cache; and
transmitting the stored session identifier to the second virtual machine.

12. The non-transitory computer-readable medium of claim 11, further comprising:
in response to determining that the encrypted session is still active, determining that a health quality of an encrypted connection associated with the encrypted session is below a threshold;
in response to determining that the health quality of the encrypted connection is below the threshold, modifying a destination for the encrypted connection associated with the stored session identifier from the computer to a second computer.

13. The non-transitory computer-readable medium of claim 12, wherein determining that the health quality of the encrypted connection associated with the encrypted session is below a threshold comprises:
determining the health quality of the encrypted connection based on one or more of an amount of load to the computer and a heartbeat time for data sent to the computer; and
comparing the determined health quality to the threshold.

14. The non-transitory computer-readable medium of claim 11, further comprising:
identifying, by the first virtual machine, user credentials associated with a user session that initiated the transmission of the second data packet;
querying a database to determine permissions associated with the user credentials; and
granting the user session access to the encrypted session in response to determining the permissions associated with the user credentials grant access to the computer.

15. The non-transitory computer-readable medium of claim 9, further comprising:
receiving, by the first virtual machine, a second data packet sent by the computer, addressed for transmission to the application running on the second virtual machine, and intercepted prior to being received by the second virtual machine;
storing the second data packet in the cache;
decrypting the stored second data packet using an algorithm associated with the session identifier for the established encrypted session between the second virtual machine and the computer; and
transmitting the decrypted second data packet to the application running on the second virtual machine.

16. The non-transitory computer-readable medium of claim 9, wherein the stored data packet is encrypted using private keys stored by the first virtual machine.

17. An apparatus comprising:
a processing device; and
a memory coupled to the processing device, the memory storing instructions which, when executed by the processing device, cause the apparatus to:
receive, by a first virtual machine, a data packet sent by an application running on a second virtual machine, addressed for transmission to a computer, and intercepted prior to being transmitted to the computer;
store the data packet in a cache;
send a request message to a transmission protocol stack of the second virtual machine, the request message used to initiate an encrypted session between the second virtual machine and the computer;
receive a response message indicating the encrypted session between the second virtual machine and the computer is established;
in response to receiving the response message indicating the encrypted session between the second virtual machine and the computer is established, encrypt the stored data packet; and
transmit the encrypted data packet to the transmission protocol stack of the second virtual machine for transmission to the computer.

18. The apparatus of claim 17, wherein the instructions further cause the apparatus to:
receive, by the first virtual machine, a second data packet sent by a second application running on the second virtual machine, addressed for transmission to the computer, and intercepted prior to being transmitted to the computer;
determine, using a source identifier associated with the second virtual machine and a destination identifier associated with the computer, that the encrypted session between the second virtual machine and the computer is still active;
in response to determining that the encrypted session is still active, retrieve a stored session identifier for the encrypted session; and
initiating a reconnection of the encrypted session.

19. The apparatus of claim 18, wherein initiating the reconnection of the encrypted session comprises:
storing the session identifier for the established encrypted session between the second virtual machine and the computer in the cache; and
transmitting the stored session identifier to the second virtual machine.

20. The apparatus of claim 19, wherein the instructions further cause the apparatus to:
in response to determining that the encrypted session is still active, determine that a health quality of an encrypted connection associated with the encrypted session is below a threshold;
in response to determining that the health quality of the encrypted connection is below the threshold, modify a destination for the encrypted connection associated with the stored session identifier from the computer to a second computer.

* * * * *